Figure 1:
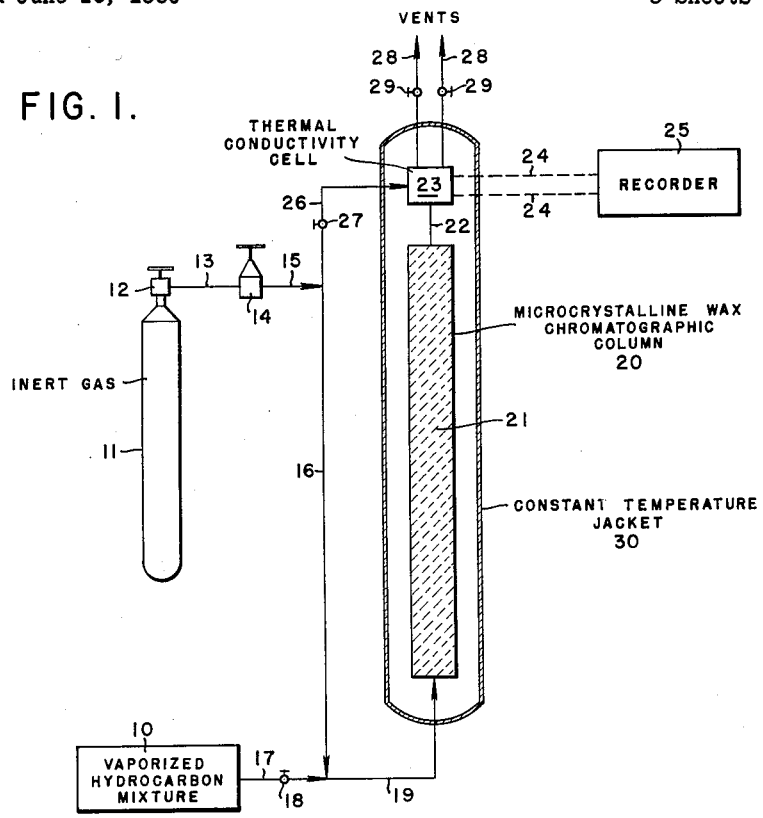

Jan. 22, 1963  W. C. JONES, JR  3,074,881
SEPARATION OF HYDROCARBON MIXTURES
Filed June 16, 1960  3 Sheets-Sheet 1

INVENTOR.
WILLIAM C. JONES, JR.,
BY
ATTORNEY.

Jan. 22, 1963   W. C. JONES, JR   3,074,881
SEPARATION OF HYDROCARBON MIXTURES
Filed June 16, 1960   3 Sheets-Sheet 2

INVENTOR.
WILLIAM C. JONES, JR.,
BY
ATTORNEY.

Jan. 22, 1963  W. C. JONES, JR  3,074,881
SEPARATION OF HYDROCARBON MIXTURES
Filed June 16, 1960  3 Sheets-Sheet 3

INVENTOR.
WILLIAM C. JONES, JR.
BY
ATTORNEY.

3,074,881
SEPARATION OF HYDROCARBON MIXTURES
William C. Jones, Jr., Baytown, Tex., assignor, by mesne assignments, to Esso Research and Engineering Company, Elizabeth, N.J., a corporation of Delaware
Filed June 16, 1960, Ser. No. 36,612
11 Claims. (Cl. 208—308)

The present invention is directed to the separation of hydrocarbon mixtures. More particularly, the invention is directed to an improved method of partition chromatography. In its more specific aspects, the invention is directed to vapor-liquid partition chromatography employing a substrate.

The invention may be briefly described as a method for separating vaporous hydrocarbon mixtures which comprises contacting a vaporous mixture in a stream of an inert gas in an elongated column containing liquefied saturated hydrocarbon microcrystalline wax having a molecular weight in the range from about 580 to about 850, and an ASTM (D 127–49) melting point of at least 195° F. whereby said hydrocarbon mixture is separated into its components. The liquefied saturated hydrocarbon microcrystalline wax may suitably be employed on an inert support such as firebrick or diatomaceous earth, but in accordance with the present invention, the contacting operation may be performed in an elongated column having a length-to-diameter ratio in the range from about 5000/1 to about 250,000/1 wherein a support is not employed, the column being of such dimensions that the liquefied saturated hydrocarbon microcrystalline wax contacts the vaporized hydrocarbon mixture to effect a separation thereof.

The inert gas is preferably helium, but other inert gases may be employed such as argon, nitrogen, hydrogen, carbon dioxide, and the rare inert gases such as neon and the like.

Temperatures employed in the practice of the present invention may range from about 190° F. to about 400° F. with a preferred temperature in the range from about 250° F. to about 390° F.

Inlet pressures to the column may range from about 1 to about 100 pounds per square inch gauge with inlet pressures in the range from about 20 to about 60 pounds per square inch gage giving desirable results.

Where a support such as firebrick or diatomaceous earth is employed, the support may have a mesh size in the range from about 40 to 60 mesh and the saturated hydrocarbon microcrystalline wax may be used in amounts ranging from about 15 to about 60 percent by weight of the support. Twenty percent by weight of the saturated hydrocarbon microcrystalline wax gives desirable results. While acid-treated firebrick or acid-treated diatomaceous earth such as Celite (which is unfired diatomaceous earth) are preferred supports, other supports such as pumice, silica gel, activated carbon, and other similar finely-divided inert materials may be used.

The present invention may be employed to separate vaporous mixtures into their component parts. For example, vaporous mixtures of paraffinic hydrocarbons boiling in the range from about 60° F. to about 500° F. or vaporous mixtures of aromatic hydrocarbons in this range may also be separated. Similarly, vaporous mixtures of olefinic and naphthenic hydrocarbons may be resolved into their component parts.

The invention is applicable to separation of the $C_6$ to $C_{10}$ aromatic hydrocarbons. Thus, separations of the isomers of xylenes, the alkyl benzenes such as those having from one to three carbon atoms in an alkyl group may be separated. Likewise, separations of the homologous paraffinic hydrocarbons may be achieved, such as separations of paraffins having from five to twenty carbon atoms in the molecule. Olefins and naphthenes having from about six to twenty carbon atoms in the molecule may also be separated. It is also contemplated that mixtures of paraffins, aromatics, and naphthenes may also be separated in accordance with this invention although it is preferred to separate isomeric hydrocarbons from each other. Generally speaking, any hydrocarbon mixture boiling within the range indicated may be separated. Specifically, the present invention is applicable to hydrocarbon mixtures such as gasoline, naphtha, kerosene fractions, and the like.

It is possible, in the practice of this invention, to separate, in a mixture containing all three, aromatics, paraffins, and naphthenes. Each of the components of a mixture may be separated from its own kind as well as from the other two components.

The vaporous mixture may be retained in contact with the saturated hydrocarbon microcrystalline wax for a time in the range from about 2 to about 600 minutes. Good results may be achieved at contact times in the range from about 2 to 600 minutes, depending on the boiling range of the mixture being separated.

Figure 6:
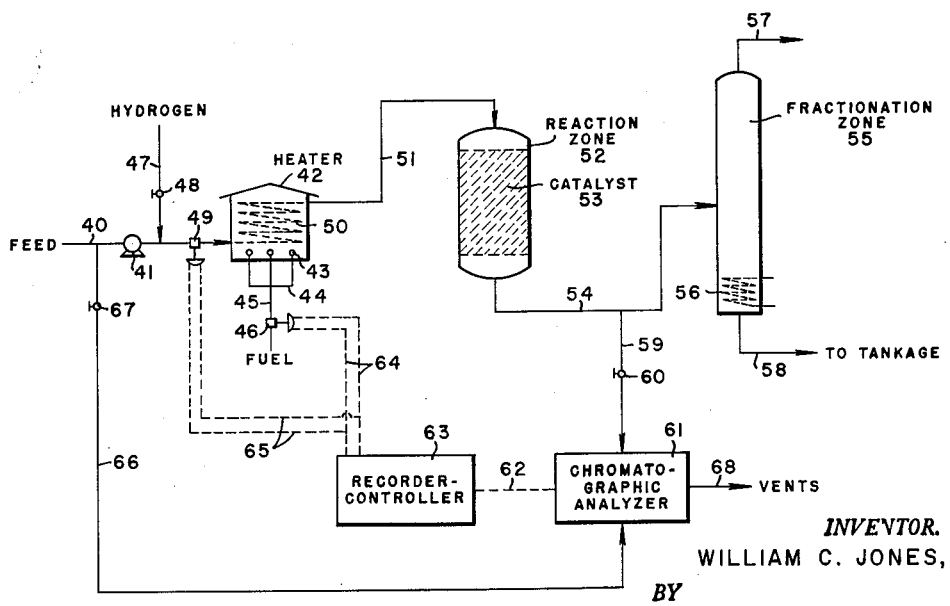
Figure 2:
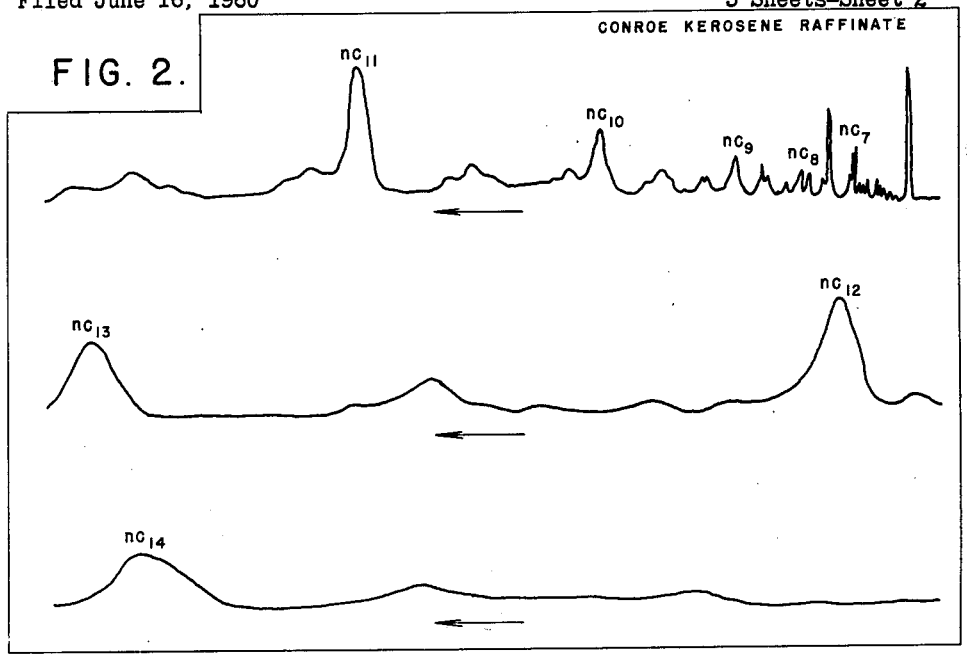
Figure 3:
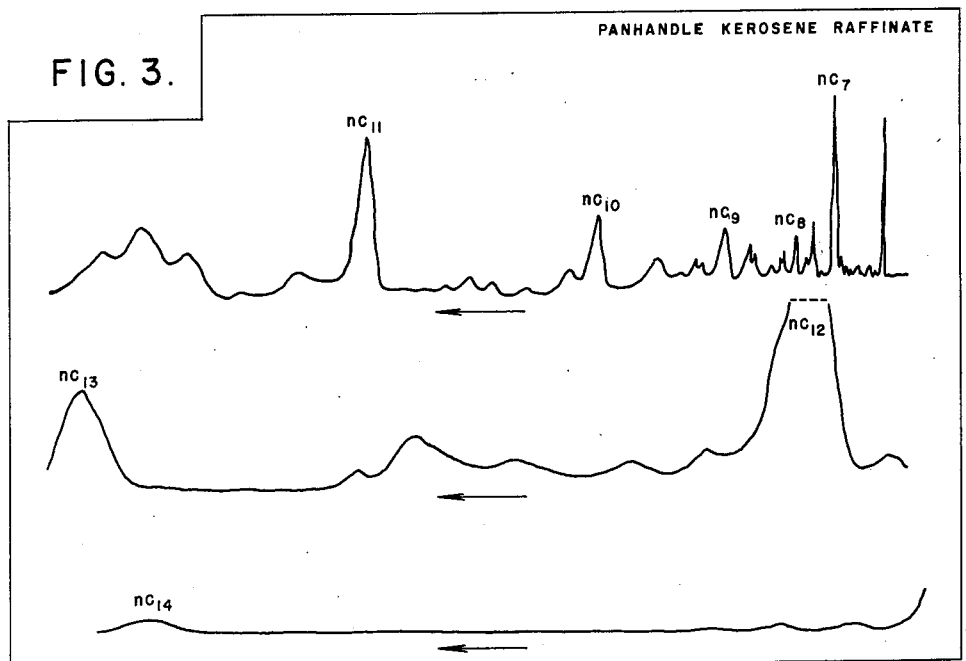
Figure 4:
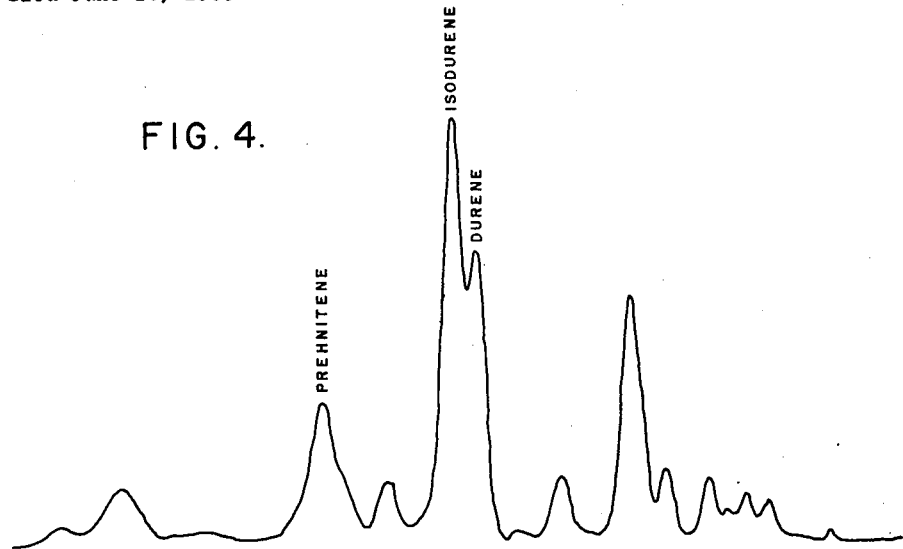
Figure 5:
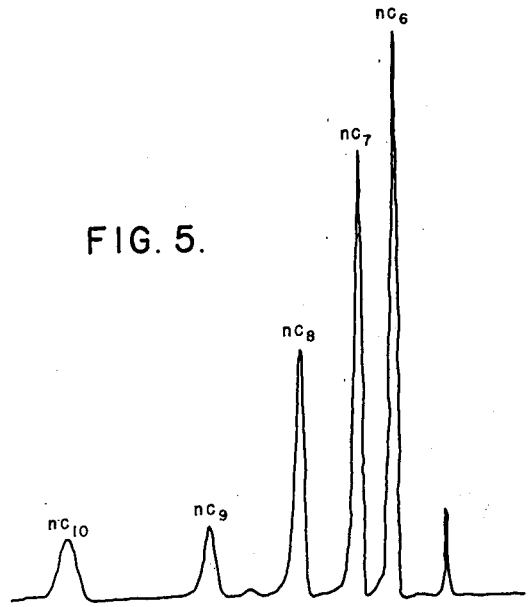

The present invention will be further illustrated by reference to the drawing in which:

FIG. 1 is a flow sheet of a preferred mode;
FIG. 2 is a chromatogram of a naphtha fraction;
FIG. 3 is a chromatogram of another naphtha fraction;
FIG. 4 is a chromatogram of an aromatic fraction;
FIG. 5 is a chromatogram of a mixture of n-paraffins; and
FIG. 6 is a flow sheet illustrating the application of the present invention to control of a process operation.

Referring now to the drawing and particularly to FIG. 1, a tank 11 containing an inert gas such as helium is provided, which is controlled by valve 12. Line 13 leads into a pressure regulator 14, which suitably reduces the pressure and discharges helium by way of line 15 into line 16. Admitted into line 16 is the vaporous mixture, which may be a hydrocarbon mixture of the nature described, which is introduced by line 17 controlled by valve 18. The helium and hydrocarbon vapors then flow by line 19 into the chromatographic column 20, which may be packed with microcrystalline wax and firebrick, as indicated by the packing 21. The column 20 resolves the vaporous mixture into its component parts which flow sequentially from the column 20 by line 22 into thermal conductivity cell 23, which, by difference in thermal conductivity, indicates the presence and amounts of the various components. A signal is conducted from the cell 23 by electrical leads 24 into a recorder 25, which is of the type which draws a graph showing the proportions of the various components in the effluent flowing by line 22 into cell 23.

A portion of the helium in line 15 is suitably passed by line 26 controlled by valve 27 into cell 23 and flows outwardly therefrom by way of valve controlled vents 28 along with the effluent gases from line 22. Lines 28 are controlled by valves 29.

The assembly, including the column 20 and the thermal conductivity cell 23, is suitably housed in a constant temperature jacket 30 which maintains temperature at the desired constant level.

It is to be emphasized that sample introduction and separation into the components of the sample are intermittent. In short, pulses of the sample are introduced and the components are withdrawn in a similar fashion. It is to be noted that samples of a predetermined size may be introduced at a predetermined time and to this end, tank 10 may be a measuring tank as may be desired.

In practicing the present invention, a column having a length in the range from about 5 to about 100 feet and a diameter in the range from about 0.005 to about 0.670 inch may be employed. A column which gives satisfactory results is a ¼ inch diameter column which is 20 feet long and packed with 22 percent of the saturated hydrocarbon microcrystalline wax on Johns-Manville C-22 firebrick having a mesh from about 40 to about 60 which has been treated with a suitable acid of a suitable strength. A temperature of about 140° C. to 200° C. may be used at an inlet pressure of about 30 pounds gauge.

In order to illustrate the present invention further, a mixture of normal paraffins was separated into its component parts by contacting same with a substrate of 22 percent microcrystalline wax on C-22 Johns-Manville acid-treated firebrick.

The data from this operation are shown in Table I.

*Table I*

[Application: Normal paraffins]

Column:
    Length 20′, diameter ¼″
    Support: C-22 brick
    Mesh 40–60; pretreat 12 N HNO$_3$
Operating conditions:
    Temp. 320.0° F.; 160° C.
    Carrier gas—Helium:
        Inlet pressure—30 p.s.i.g.
Flow rate, ml./min.—97
Chart speed, in./min.—0.1

| B.P. | | Compound | Rel. ret. values | Min. past air | Mm. past air | P.W.[1] (mm.) |
|---|---|---|---|---|---|---|
| ° C. | ° F. | | | | | |
| 68.7 | 155.7 | n-Hexane | 1.0 | 2.4 | 6 | 0.3 |
| 98.4 | 209.2 | n-Heptane | 1.8 | 4.3 | 11 | 0.6 |
| 125.7 | 258.2 | n-Octane | 3.0 | 7.1 | 18 | 1.1 |
| 150.8 | 303.4 | n-Nonane | 5.1 | 12.2 | 31 | 1.3 |
| 174.1 | 345.4 | n-Decane | 8.7 | 20.8 | 53 | 2.3 |
| 195.9 | 384.6 | n-Undecane | 14.9 | 35.8 | 91 | 3.2 |
| 216.3 | 421.3 | n-Dodecane | 25.5 | 61.4 | 156 | 5.3 |
| 235.5 | 455.8 | n-Tridecane | 43.7 | 105.0 | 267 | 8.6 |
| 253.5 | 488.4 | n-Tetradecane | 74.3 | 178.0 | 453 | 14.0 |

[1] P.W. = Peak width at half height.

Similar operations were performed with aromatic fraction employing similar conditions with a similarly treated acid-treated firebrick containing an identical amount of the saturated hydrocrbon microcrystalline wax. The data from this operaton are presented in Table II.

*Table II*

[Application: Aromatics]

Column:
    Length 20′, diameter ¼″
    Support: C-22 brick
    Mesh 40–60; pretreat 12 N HNO$_3$
Operating conditions:
    Temp. 284.0° F.; 140° C.
    Carrier gas—Helium:
        Inlet pressure—30
Flow rate, ml./min.—97
Chart speed, in./min.—1.0

| B.P. | | Compound | Rel. ret. values | Min. past air | Mm. past air | P.W.[1] (mm.) |
|---|---|---|---|---|---|---|
| ° C. | ° F. | | | | | |
| 80.1 | 177.2 | Benzene | 1.0 | 4.8 | 122 | 4.7 |
| 110.6 | 231.1 | Toluene | 1.9 | 9.3 | 236 | 8.6 |
| 136.2 | 277.1 | Ethylbenzene | 3.3 | 16.0 | 406 | 13.3 |
| 139.1 | 282.4 | (Meta) (Para) Xylene | 3.7 | 17.8 | 452 | 14.6 |
| 144.4 | 291.9 | Orthoxylene | 4.3 | 20.6 | 522 | 16.6 |
| 152.4 | 306.3 | Isopropylbenzene | 4.7 | 22.6 | 573 | 18.0 |
| 159.2 | 318.6 | Normal-propylbenzene | 5.7 | 27.1 | 690 | 21.0 |
| 161.3 | 322.3 | {1-methyl-4-ethyl, 1-methyl-3-ethyl} Benzene | 6.2 | 30.0 | 762 | 23.0 |
| 164.7 | 328.5 | {1,3,5-trimethyl, 1-methyl-2-ethyl} Benzene | 7.0 | 33.4 | 848 | 25.1 |
| 169.4 | 336.9 | 1,2,4-trimethylbenzene | 8.2 | 39.5 | 976 | 29.8 |
| 176.1 | 349.0 | 1,2,3-trimethylbenzene | 9.4 | 45.3 | 1,155 | 34.6 |

[1] P.W. = Peak width at half height.

Another aromatic fraction was contacted in a similar column containing identical amounts of the hydrocarbon microcrystalline wax with the results obtained shown in Table III.

*Table III*

[Application: Aromatics]

Column:
    Length 20′, diameter ¼″
    Support: C-22 brick
    Mesh 40–60; pretreat 12 N HNO$_3$
Operating conditions:
    Temp. 284° F.; 140° C.
    Carrier gas—Helium:
        Inlet pressure—30
Flow rate, ml./min.—97
Chart speed, in./min.—0.1

| B.P. | | Compound | Rel. ret. values | Min. past air | Mm. past air | P.W.[1] (mm.) |
|---|---|---|---|---|---|---|
| ° C. | ° F. | | | | | |
| 181.1 | 357.9 | 1,3-diethylbenzene | 1.0 | 49.2 | 125 | 4.1 |
| 183.4 | 362.2 | 1,2-diethylbenzene | 1.04 | 52.0 | 132 | 4.5 |
| 183.8 | 362.8 | 1,4-diethylbenzene | | | | |
| 183.7 | 362.8 | 1,3-dimethyl-5-ethylbenzene | 1.10 | 54.3 | 138 | 4.6 |
| 186.9 | 368.4 | 1,4-dimethyl-2-ethylbenzene | 1.20 | 59.1 | 150 | 4.7 |
| 188.4 | 371.1 | 1,3-dimethyl-4-ethylbenzene | 1.25 | 61.8 | 157 | 4.8 |
| 189.8 | 373.6 | 1,2-dimethyl-4-ethylbenzene | 1.28 | 63.0 | 160 | 4.9 |
| 196.8 | 386.2 | 1,2,4,5-tetramethylbenzene | 1.66 | 81.6 | 207 | 6.6 |
| 198.0 | 388.4 | 1,2,3,5-tetramethylbenzene | 1.71 | 84.3 | 214 | 6.7 |
| 205.0 | 401.0 | 1,2,3,4-tetramethylbenzene | 2.03 | 99.7 | 253 | 7.7 |
| 217.9 | 424.1 | Naphthalene | 2.53 | 125.7 | 320 | 8.6 |

[1] P.W. = Peak width at half height.

Another operation was performed on an indanes fraction employing a column containing 22 percent of the saturated hydrocarbon microcrystalline wax on the firebrick support as in the other examples. The results from this run are shown in Table IV.

*Table IV*

[Application: Indanes]

Column:
  Length 20', diameter ¼"
  Support: C-22 brick
  Mesh 40-60; pretreat 12 N HNO₃
Operating conditions:
  Temp. 284° F.; 140° C.
  Carrier gas—Helium: Inlet pressure—30
Flow rate, ml./min.—97
Chart speed, in./min.—0.1

| B.P.[1] | | Compound | Rel. ret. values | Min. past air | Mm. past air | P.W.[2] (mm.) |
| --- | --- | --- | --- | --- | --- | --- |
| ° C. | ° F. | | | | | |
| 177.5 | 351.5 | Indane | 1.0 | 49.2 | 125 | 3.7 |
| 186.9 | 367.2 | 2-methylindane | 1.2 | 62.0 | 157 | 4.9 |
| 187.3 | 368.6 | 1-methylindane | 1.3 | 64.6 | 164 | 5.1 |
| 201.1 | 394.0 | 5-methylindane | 1.8 | 91.3 | 232 | 7.5 |
| 204.4 | 400.0 | 4-methylindane | 2.0 | 97.7 | 248 | 7.6 |

[1] Approximate.
[2] P.W.=Peak width at half height.

In the tables, by way of explanation, "min." is an abbreviation for "minutes"; "mm." is an abbreviation for "millimeters." These terms refer to measurements taken from recorder charts wherein are recorded the detector signals from gas chromatographic separators.

The terminology used is common in many compilations of gas chromatographic retention data. By way of explanation, most samples contain enough air to register a signal. In gas-liquid chromatography since air (oxygen, nitrogen, argon, and hydrogen, if present) is always the first peak eluted, this makes a convenient reference point for retention measurements. Fundamentally, this is a better reference point than the sample injection point. Since the chart speed is known, it is simple to convert chart travel distance to minutes. Minutes and millimeters both are often tabulated as a matter of convenient reference.

It will be clear from the data shown in Tables I and IV that paraffinic, aromatic, and similar fractions may be separated by contacting same with a column employing the saturated hydrocarbon microcrystalline wax. Likewise, with reference to FIGS. 2 to 4, inclusive, it will be seen from the several chromatograms that separations have been made of various naphtha and kerosene fractions. The chromatograms of FIGS. 2 to 5, inclusive, were obtained under similar conditions to the data presented in Table I. The data obtained in FIG. 2 was with a similar column at a temperature of 320° F. and an inlet pressure of 30 pounds per square inch gauge. It will be noted that a sharp resolution was obtained.

The data shown in FIG. 3 were obtained under similar conditions as the data contained in FIG. 2.

In FIG. 4, similar conditions were obtained with the exception that the temperature was 284° F. The sharpness of separation among the various isomeric durenes is evident.

The conditions for FIG. 5 were also similar to those of FIGS. 2 to 4 and a temperature of 200° C. was employed. It will be noted that in FIG. 5 normal paraffin type hydrocarbons were separated sharply as indicated by their peaks.

The present invention is quite important and useful in that sharp separations may be obtained in separating components in close boiling hydrocarbon mixtures.

The invention is also useful in controlling process operations in that the signal from the thermal conductivity cell 23 may be lead into a recorder-controller 25 and the output therefrom used to control a process variable such as temperature, pressure, feed rate, and the like. Particularly, the operation in accordance with the present invention may be used in controlling catalytic conversion operations such as platinum reforming.

The catalytic conversion operation may suitably be a hydroforming operation or a catalytic cracking operation or a dehydrogenation, aromatization or cyclization operation. Suitably, the catalytic conversion may also be a cracking reaction such as one of the fluidized or fixed bed type.

The catalyst employed in the present invention where catalytic reforming or catalytic conversion is employed, may suitably be a catalyst comprising major portions of aluminum oxides and minor portions of oxides or sulfides of the metals of Groups IV, V, VI, and VIII of the Periodic Chart of the Atoms, 1947 edition, designed by Henry D. Hubbard, published by W. M. Welch Manufacturing Company, Chicago, Illinois. The oxides or sulfides of vanadium, molybdenum, chromium, tungsten, and nickel are particularly effective. Various forms of aluminum oxide may be used, such as activated alumina, bauxite, alumina hydrates, alumina gel and peptized alumina gels. Catalysts comprising alumina, such as prepared from gamma alumina containing from about 1 to about 20% by weight of molybdenum oxide or chromium oxide, are very suitable for catalytic reforming in the present invention. Other suitable catalysts are the platinum-containing catalysts such as those containing from about 0.1 to 1.0 percent by weight of platinum deposited on a suitable carrier, such as catalytic grade alumina. When platinum catalysts are employed, it may be desirable to provide in contact with the catalyst a chloride to maintain the activity of the catalyst.

The present invention is suitably conducted in the presence of hydrogen which may be supplied as pure hydrogen or a gas containing hydrogen.

The term "catalytic reforming" wherever used in the specification and claims shall be understood to mean any process of subjecting hydrocarbon oils consisting essentially of hydrocarbons boiling in the gasoline range to heat treatment at a temperature in excess of 500° F. and in the presence of catalysts to produce a dehydrogenated or otherwise chemically reconstructed product, for example, of anti-knock characteristics superior to those of the starting material, with or without an accompanying change in molecular weight. By the term "chemically reconstructed" is meant something more than the mere removal of impurities or ordinary finishing treatments. The term "catalytic reforming" shall be understood to include, but not by way of limitation, reactions such as dehydrogenation, aromatization or cyclization, desulfurization alkylation and isomerization, all or some of which may occur to a greater or lesser extent during the process.

The term "catalytic reforming in the presence of hydrogen," wherever used in the specification and claims, shall be understood to mean a process of catalytic reforming carried out in the presence of added or recirculated hydrogen or gases containing hydrogen under such conditions that there is either no overall net consumption of free hydrogen or there is an overall net production of free hydrogen.

Processes of catalytic reforming and catalytic reforming in the presence of hydrogen are endothermic and consequently heat must be supplied to the reaction zone to maintain the temperature required for the reaction. The catalysts ordinarily used in catalytic reforming and catalytic reforming in the presence of hydrogen gradually lose their activity in promoting the desired reactions because of the formation or deposition thereon during use of carbonaceous contaminants such as coke. These contaminants must be periodically removed in order to regenerate the activity of the catalysts. The length of time the catalyst can be used before it requires regeneration is much shorter in the case of catalytic reforming than in catalytic reforming in the presence of hydrogen and in fact this is one of the principal reasons for conducting the catalytic reforming treatment in the presence of hydrogen.

Hydroforming as used in the specification and claims is intended to cover catalytic reforming in the presence of hydrogen.

The apparatus employed in our operations includes a suitable recorder-controller of which many are available on the market. For example, the Brown Instrument Company recorder-controller may be employed or the so-called Foxboro dynalog recorder may be used, such as manufactured by the Foxboro Company, Foxboro, Massachusetts.

Referring now to the drawing and particularly to FIG. 6, numeral 40 designates a feed line through which a feed hydrocarbon boiling in the range from about 100° to about 500° F. is fed into the system from a source, not shown. This feed hydrocarbon suitably is comprised of paraffins and naphthenes and may be either paraffins or naphthenes containing small amounts of virgin aromatics. The feed in line 40 is pumped by pump 41 into a heater or furnace 42 provided with burners 43, supplied with a fuel gas such as natural gas, through a manifold 44 from line 45 controlled by valve 46.

Hydrogen from a source not shown is introduced into line 40 by way of line 47 controlled by valve 48. Valve 49 in line 40 controls the rate of feed and hydrogen admitted to heater 42 for passage through heating coils 50. The heated feed mixture to which hydrogen has been added is discharged from coil 50 by way of line 51 into a reaction zone 52 provided with a bed of catalyst 53. Suitable conversion conditions are maintained in reaction zone 52 as a result of which the paraffins and naphthenes are converted substantially to aromatics and other fractions of higher octane number than the feed hydrocarbon. For example, as stated before, some isomerization, cracking and other reactions may take place. The product stream from reaction zone 52 issues therefrom by way of line 54 and is discharged by line 54 into fractionation zone 55. Fractionation zone 55 is suitably equipped with internal baffling equipment, such as bell cap trays and the like, for intimate contact between vapors and liquids and is provided with heating means, such as steam coil 56, for regulation of temperature and pressure. While fractionation zone 55 is illustrated as a single distillation tower, it suitably may comprise a plurality of distillation towers, each equipped with all auxiliary equipment necessary for such distillation towers, such as means for inducing reflux, condensing and cooling means and the like. Temperature and pressure conditions are adjusted to take off light fractions by way of line 57, such as $C_5$ and lighter hydrocarbons, while heavier fractions are withdrawn by way of line 58.

The heavier fractions withdrawn by line 58 which contain the desirable octane number components are then routed thereby to tankage, not shown.

Connected to line 54 is line 59 controlled by valve 60 by way of which a portion of the product in line 54 is routed into chromatographic analyzer 61 which is illustrated in more detail in FIG. 1. The product in line 59 is introduced in a vaporous condition into analyzer 61 for separation into its component parts and signals which are a function of the composition of the product in line 54 are directed by lead 62 to a recorder-controller 63 which in turn is connected by leads 64 and 65 to valves 45 and 49 which control, respectively, gas feed to burners 43 and flow of feed to coil 50. Hence, any variation in the compensation of the product may be employed to control heat input and/or feed rate.

Likewise, a portion of the feed in line 40 may be diverted by line 66 controlled by valve 67 into analyzer 61 for separation into its component parts and any fluctuation or variation of feed composition used to control a process variable such as heat input or feed rate. Although not shown, means may be provided in line 66 to heat and/or vaporize the feed for introduction into analyzer 61. Other process variables may also be controlled in a similar fashion. It is understood, of course, that the feed or product, as the case may be, is fed intermittently into analyzer 61 in pulses.

Line 68 from analyzer 61 may be used to vent any of the vaporized hydrocarbons fed thereto.

In the preferred embodiment of FIG. 6, only a single reaction zone is shown, however, it is usual to employ a plurality of reaction zones, each containing catalyst of the type mentioned, and it is usual in hydroforming and similar operations to feed the hydrocarbon sequentially through the reaction zones although the feed may be charged to the reaction zones in parallel as may be desired.

The catalyst employed in reaction zone 52 is preferably a platinum catalyst on an alumina support.

The present invention is also applicable to fluidized operations, such as fluidized cracking or fluidized hydroforming.

The microcrystalline wax is a saturated hydrocarbon having a molecular weight range from about 580 to about 850 and is characterized by having a predominantly straight chain of $CH_2$ groups with lesser amounts of short branches. The straight chain may be attached to naphthene groups which, in themselves, are saturated hydrocarbons. The microcrystalline wax has a negligible acid number and saponification number and has an ASTM penetration value (D 1321–54T) at 77° F. of 2 maximum and has a color not more than 1½ N.P.A. (ASTM D 155–45T).

The nature and objects of the present invention having been completely described and illustrated, what I wish to claim as new and useful and secure by Letters Patent is:

1. A method for separating hydrocarbon mixtures which comprises contacting a vaporous hydrocarbon mixture boiling in the range from about 60° to about 500° F. at a temperature in the range from about 195° to about 350° F. with an elongated column of liquefied saturated hydrocarbon microcrystalline wax having a molecular weight in the range from about 580 to about 850 and an ASTM (D 127–49) melting point of at least 195° F. whereby said hydrocarbon mixture is separated into its components.

2. A method in accordance with claim 1 in which the hydrocarbon mixture is paraffinic.

3. A method in accordance with claim 1 in which the hydrocarbon mixture is aromatic.

4. A method in accordance with claim 1 in which the hydrocarbon mixture is naphthenic.

5. A method for separating hydrocarbon mixtures which comprises contacting a vaporous hydrocarbon mixture boiling in the range from about 60° to about 500° F. at a temperature in the range from about 195° to about 350° F. with an elongated column of liquefied saturated hydrocarbon microcrystalline wax having a molecular weight in the range from about 580 to about 850 and an ASTM (D 127–49) melting point of at least 195° F. on a support whereby said hydrocarbon mixture is separated into its components.

6. A method in accordance with claim 5 in which the support has a mesh size in the range from about 40 to about 60.

7. A method in accordance with claim 6 in which the support is acid-treated firebrick.

8. A method for separating hydrocarbon mixtures which comprises contacting a $C_6$ to $C_{10}$ vaporous aromatic hydrocarbon mixture boiling in the range from about 60° to about 500° F. at a temperature in the range from about 195° to about 350° F. with an elongated column of liquefied saturated hydrocarbon microcrystalline wax having a molecular weight in the range from about 580 to about 850 and an ASTM (D 127–49) melting point of at least 195° F. whereby said hydrocarbon mixture is separated into its components.

9. A method in accordance with claim 8 in which the aromatic hydrocarbon mixture contains xylenes.

10. A method in accordance with claim 8 in which the aromatic hydrocarbon mixture contains durenes.

11. A method for separating hydrocarbon mixtures which comprises contacting a vaporous hydrocarbon mixture boiling in the range from about 60° to about 500° F. at a temperature in the range from about 195° to about 350° F. with an elongated column containing from about 15% to about 60% by weight of liquefied saturated hydrocarbon microcrystalline wax having a molecular weight in the range from about 580 to about 850 and an ASTM (D 127–49) melting point of at least 195° F. on a 40 to 60 mesh inert support whereby said hydrocarbon mixture is separated into its components.

References Cited in the file of this patent

UNITED STATES PATENTS

| | | |
|---|---|---|
| 2,839,152 | Tracht | June 17, 1958 |
| 2,841,005 | Coggeshall | July 1, 1958 |
| 2,868,011 | Coggeshall | Jan. 13, 1959 |
| 2,875,849 | Edwards et al. | Mar. 3, 1959 |
| 2,893,955 | Coggeshall | July 7, 1959 |
| 2,903,417 | Beaugh et al. | Sept. 8, 1959 |

OTHER REFERENCES

"The Chemistry and Technology of Waxes," Warth, pages 430–431, 434, 435, Reinhold Pub. Corp., New York, 1956.